Figure 3:
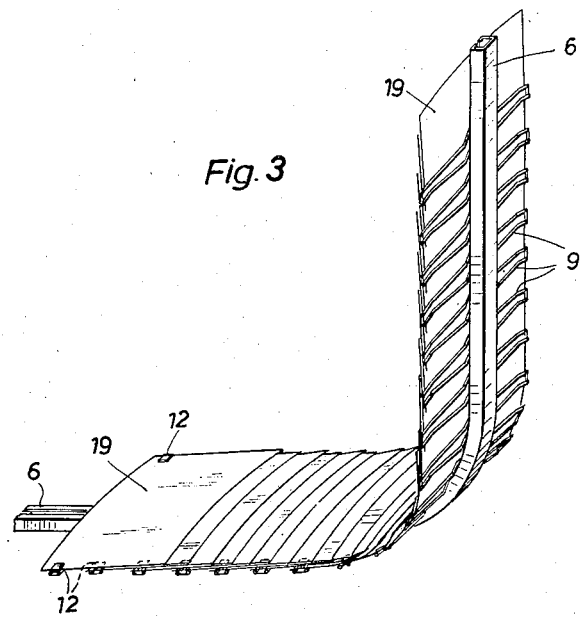

Nov. 25, 1958   W. REIST   2,861,674
CONVEYER SYSTEM FOR NEWSPAPERS, MAGAZINES AND THE LIKE
Filed July 20, 1956   4 Sheets-Sheet 1
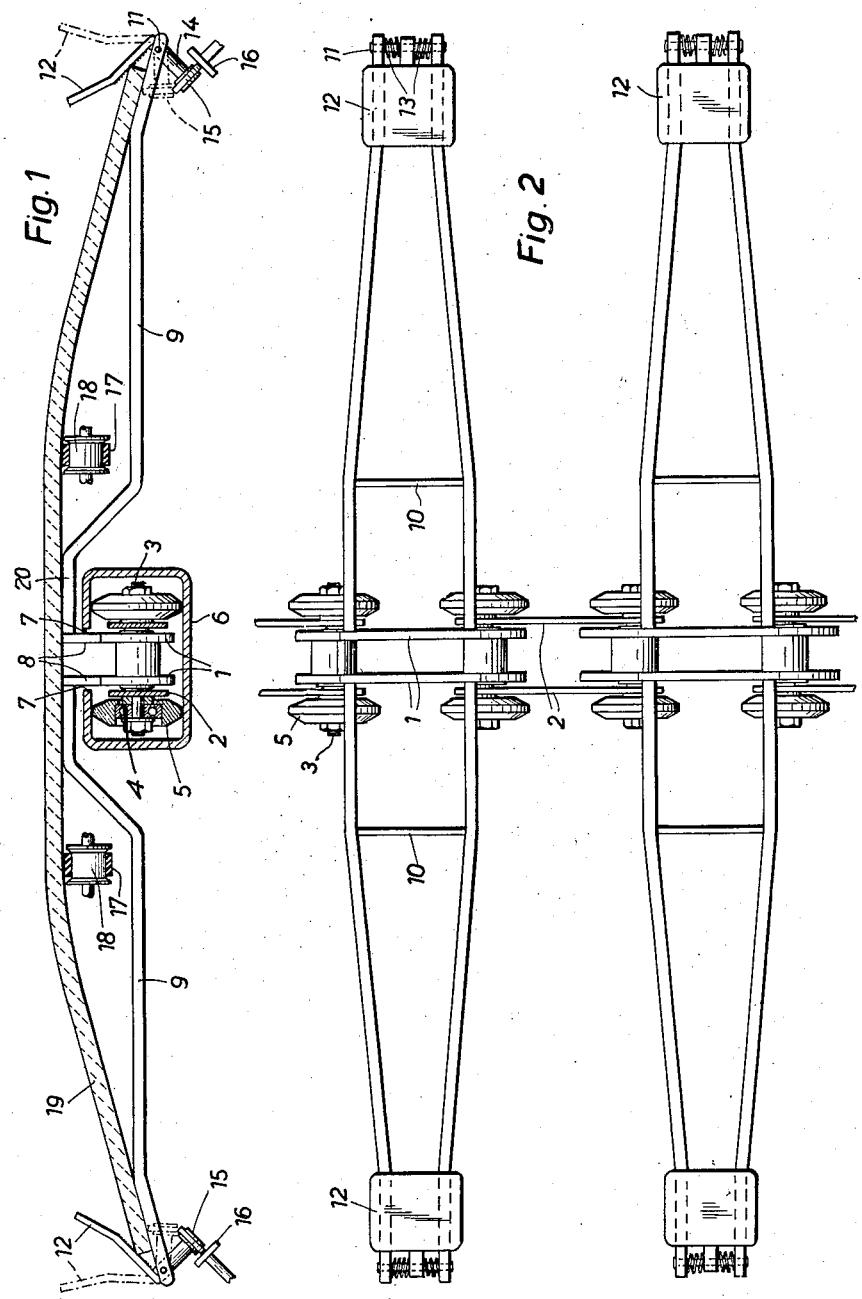

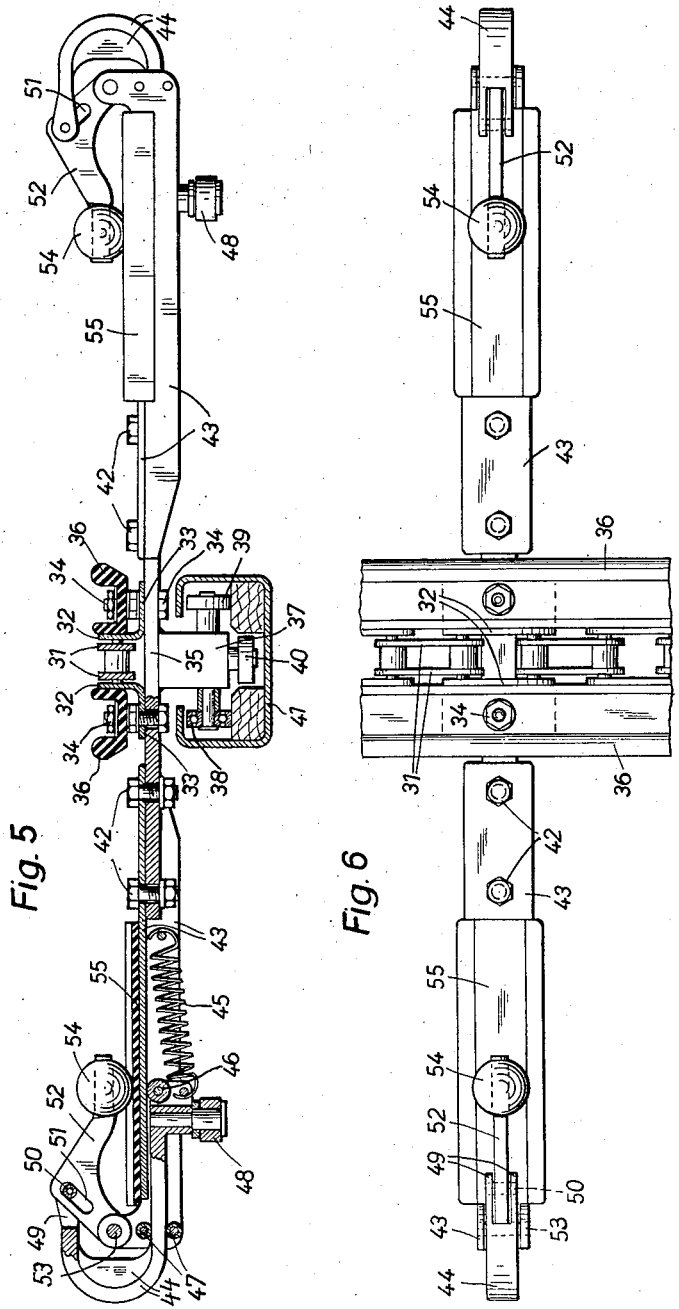

Nov. 25, 1958 W. REIST 2,861,674
CONVEYER SYSTEM FOR NEWSPAPERS, MAGAZINES AND THE LIKE
Filed July 20, 1956 4 Sheets-Sheet 4

United States Patent Office 2,861,674
Patented Nov. 25, 1958

2,861,674

CONVEYER SYSTEM FOR NEWSPAPERS, MAGAZINES AND THE LIKE

Walter Reist, Dietlikon, Zurich, Switzerland

Application July 20, 1956, Serial No. 599,158

Claims priority, application Germany July 22, 1955

2 Claims. (Cl. 198—180)

The present invention relates to apparatus for conveying newspapers and magazines, and more particularly to apparatus of the type having endless conveyor means carrying transverse brackets which are provided with clamping members at their ends for gripping two opposite edges of the articles to be conveyed.

In known apparatus of this kind, transverse brackets are secured at either end to a conveyer chain. Devices having two conveyer chains travelling parallel to each other are suitable only for limited lengths of conveying distances, and owing to their construction do not permit of any marked change in conveying direction. Moreover, the newspapers or like articles to be conveyed are situated outside of the center line of the chain so that displacements of the individual newspapers may occur at curves in the conveyer path and, for example, where movement along a helical path is required.

It is an object of the present invention to avoid these drawbacks. According to the invention, an apparatus of the above-noted type comprises a conveyer chain, carrying the transverse brackets, is arranged between the gripping points for the articles to be conveyed, while the central sections of the transverse brackets are provided with supporting points for said articles in raised position with respect to the gripping points so that the articles will be curved in transverse direction during conveying, such curvature having a stiffening effect thereon. In this manner, a substantial simplification of the conveyer is achieved. The conveying lengths can be much greater and it is possible to have distinct changes in the travelling direction of the conveyer chain without producing any displacements of the newspapers or other articles at curves or bends of the conveyer path. Smearing of freshly printed conveyed newspapers and magazines is thereby avoided.

In the apparatus according to the invention the conveying chain is situated between central supporting rails in imediate proximity to the newspapers to be transported; therefore the center line of the chain is spaced a very short distance from the supporting points for the newspapers or magazines, and consequently there will occur practically no relative displacements between successive articles conveyed in overlapping relation, when these articles pass along curves of the conveyer track.

Figure 4:
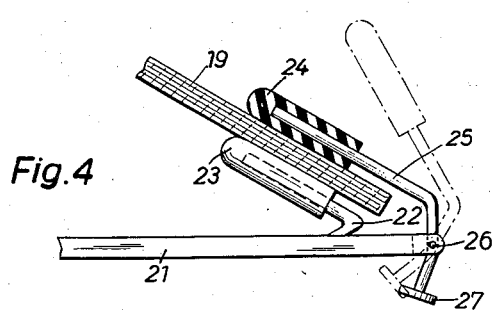
Figure 7:
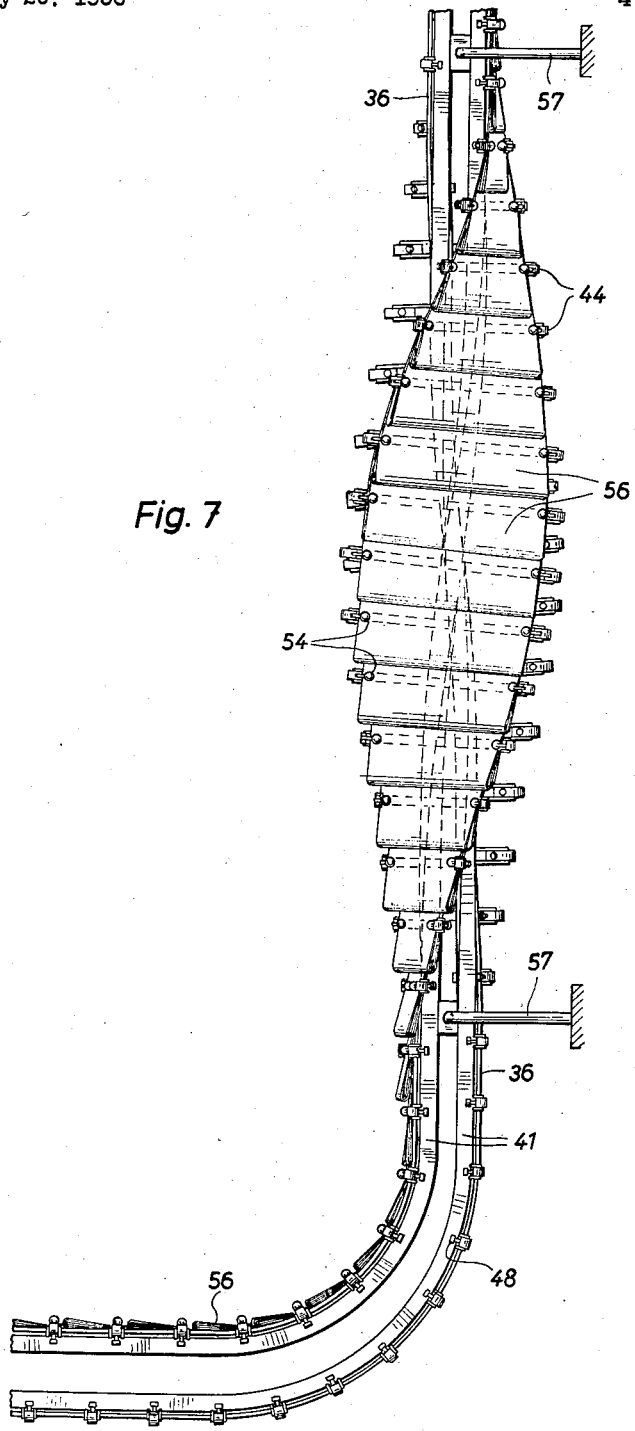

The present invention will now be described in more detail with reference to the accompanying drawings illustrating, by way of example, two embodiments of the invention, and in which:

Fig. 1 is a cross section through a conveyer according to the first embodiment of the invention, Fig. 2 is a plan view of a portion of the conveyer, the guide rail for the chain being omitted, Fig. 3 shows a fragmentary view of the conveyer, Fig. 4 shows a modification of a transverse bracket, Fig. 5 is a transverse section through a conveyer according to a third embodiment of the invention, Fig. 6 shows a top view of a section of the conveyer according to Fig. 5, and Fig. 7 is a fragmentary view of the conveyer according to Figs. 5 and 6, a torsional movement of newspapers or magazines occurring while the latter are advanced.

The conveyer chain of the apparatus according to Figs. 1 to 3 comprises inner chain links 1 and outer chain links 2. Mounted on bearing pins 3 of the chain links 1 and 2 by means of ball bearings 4 are rolls 5, which travel upon a guide rail 6, forming a closed casing with the exception of a slot 7 provided at the middle of the top portion thereof. The extended lateral portions 8 of the chain links 1 pass through the slot 7 and project towards the outside. The rods 9 forming part of transverse brackets are secured to said projecting lateral portions 8. The two rods 9 of each transverse bracket are interconnected by a strutting member 10 and at the free end by an axle 11, on which a clamping jaw 12 is pivotally supported. Two coil springs 13 act upon the clamping jaw 12, so that the latter is urged against the rods 9 of the transverse bracket. Each clamping jaw 12 carries a roll 15 provided on an arm 14. Situated at the supply and take-off place for newspapers are guide rails 16, which engage the rolls 15 to open the clamping jaws 12, as indicated in Fig. 1 by dash-and-dot lines. Moreover, at the supply and delivery place endless conveyer belts 17 are provided, which pass over guide pulleys 18 and are intended for conveying the newspapers from the folding machine to the supply point of the transport system, or else from the take-off place to some other destination. When the rolls 15 run off the guide rails 16, the clamping jaws 12 will close and tightly grip the two opposite edges of newspapers 19, while the latter in the middle section thereof rest against the bent central portions 20 of the transverse brackets. The newspapers to be transported are thereby given a slight curvature, which fact results in a stiffness very suitable for the transport of said papers. As may be seen from Fig. 3, even twice folded newspapers of larger size can be securely held while being transported.

In the modified structure illustrated in Fig. 4, the transverse bracket 21 comprises a simple rod which in the middle section thereof is bent in the same manner as the rod shown in Figs. 1 and 2. Attached at each end of the rod 21 is a supporting pin 22 for accommodating a rubber sleeve 23 slipped over the same. Cooperating with said sleeve is a second rubber sleeve 24 which is slipped over a support arm 25 pivotally mounted on an axle 26 provided on the forked end of the rod 24.

In similar manner to that described with reference to Figs. 1 and 2, the arm 25 carrying the rubber sleeve 24 is forced against the fixed rubber sleeve 23 by means of springs on the axle 26. At the supply and delivery points for newspapers, the ends 27 of the arms 25 coact with guide rails (not shown) in order to rock the arms 25 upwardly as shown by dash-and-dot lines, so that insertion of the marginal portion of newspapers between said clamping members or removal therefrom will be possible.

The conveyer chain of the apparatus according to Figs. 5 to 7 comprises inner chain links 31 and outer chain links 32. The latter are formed with angular extensions 33 which are connected with a middle section 35 of the transverse bracket by means of nut-and-bolt assemblies 34. Two channel section rails 36, which serve as a support and consist of elastic material, are connected with the middle section 35 and the conveyor chain links 31 and 32, respectively, by means of assemblies 34. The rails 36 are situated on either side of the conveyer chain links 31 and 32 and serve for the purpose of supporting the articles to be transported in the middle thereof. Secured to the middle section 35 is a support body 37, on which there are provided two lateral rollers 38 and 39 together with a bottom roller 40 and mounted by means of ball bearings. The rollers 38, 39 and 40 travel on a guide rail 41. Two lateral parts 43 are attached to the middle section 35 of the transverse bracket by means of nut-and-bolt assemblies 42. Movably guided along the bottom face of each lateral part 43 is a sliding member 44, influenced by a spring 45 of which the opposite end is fastened to the lateral part 43. Said sliding member 44 rests against the bottom face of the lateral part 43 by means of a roller 46 and passes through two rollers 47; it also carries a roller 48 which cooperates with a guide rail (not shown) at the supply and delivery point for the objects to be transported. The sliding member 44 is bent in upward direction and at its forked end 49 carries a slide roller 50, passing through an inclined slot 51 provided on a clamping jaw 52 which jaw is supported for rotation at pivot 53 and on its free end carries a ball 54 made of elastic material such as rubber, said ball cooperating with a section rail 55 likewise consisting of resilient material, such as rubber or the like.

At the supply point for the objects to be transported guide rails (not shown) act upon the rollers 48 in such a manner that the two sliding members 44 will be outwardly moved and the clamping jaws 52 will be opened. After the articles to be transported have been placed in position, the sliding members 44 will move inwardly again, the clamping jaws 52 become closed and the balls 54 urge the edges of the articles against the section rails 55 and tightly retain those edges, while the middle portions of the articles rest upon the section rails 36. A slightly convex curvature is thereby imparted to the objects to be transported, which shape provides them with a stiffness suitable for conveying operations. As may be seen from Fig. 5, in the conveyer apparatus illustrated the chain links 31 and 32 are positioned in immediate proximity to the articles to be transported, or are spaced a very short distance from the supporting points of the articles on the channel section rails 36. This arrangement offers the advantage of practically avoiding any displacements along the guiding curves of the conveyer system.

As is evident from Fig. 7, in a conveyer apparatus according to the third embodiment of the invention, in addition to travelling along a curved path, the articles may also travel along a helical path. In both instances, the individual newspapers 56 are prevented from dislodging and thus also from becoming smeared or otherwise deteriorated. Such twisting movements of the conveyer apparatus may be required in order that after completion of the conveying operation the newspapers can be taken off in correct sequence. The guide rails 41 for the transverse brackets constituted by elements 35 and 43 are secured to stationary walls by means of supporting arms 57.

I claim:

1. Apparatus for conveying newspapers and like flexible articles, comprising an endless conveyer chain, guide means for said chain, transversely extending carrying brackets for said articles secured to the chain, clamping means at either end of said transverse brackets adapted to engage two opposite edge portions of the articles to be conveyed, the clamping means defining clamping points at the ends of each bracket situated on a line passing substantially through the center of the chain, article supporting means on said brackets on either side and closely adjacent said chain, said supporting means being at a higher level with respect to the brackets than said clamping points to impart a stiffening curvature to articles engaged by said clamping means, and cooperating means on said transverse brackets cooperating with said guide means for the chain for being guided thereby, said cooperating means being on a side of said bracket which is opposite to the side at which are located said conveyor chain and said article supporting means.

2. Apparatus as claimed in claim 1 wherein each bracket includes a middle portion connected to the chain and guide rollers cooperating with said guide means.

References Cited in the file of this patent

UNITED STATES PATENTS

| 926,264 | Larsen | June 29, 1909 |
| 1,999,587 | Davis | Apr. 30, 1935 |

FOREIGN PATENTS

| 294,566 | Italy | Mar. 29, 1932 |